United States Patent [19]
Sasaki et al.

[11] Patent Number: 5,484,845
[45] Date of Patent: Jan. 16, 1996

[54] POLYACETAL COMPOSITIONS HAVING SURFACE GLOSS REDUCING EFFECTIVE AMOUNTS OF CORE-SHELL POLYMERS

[75] Inventors: Ichiro Sasaki, Osaka; Takao Teraoka, Hyogo; Junji Ohshima, Osaka; Toru Katsumata; Koichi Sato, both of Shizuoka, all of Japan

[73] Assignees: Polyplastics Co., Ltd.; Takeda Chemical Indus., Ltd., both of Japan

[21] Appl. No.: 326,355

[22] Filed: Oct. 20, 1994

Related U.S. Application Data

[63] Continuation of Ser. No. 813,271, Dec. 24, 1991, abandoned.

[30] Foreign Application Priority Data

Dec. 28, 1990 [JP] Japan ................................ 2-409267

[51] Int. Cl.$^6$ .................................................. C08L 59/02
[52] U.S. Cl. ............................................. 525/64; 525/154
[58] Field of Search .................................... 525/64, 154

[56] References Cited

U.S. PATENT DOCUMENTS

| | | | |
|---|---|---|---|
| 3,699,185 | 10/1972 | Dickie et al. | 525/902 |
| 3,749,755 | 7/1973 | Bronstert et al. | 260/876 |
| 3,856,883 | 12/1993 | Dickie et al. | 260/836 |
| 4,034,013 | 7/1977 | Lane | 260/835 |
| 4,086,300 | 4/1978 | Owens et al. | 260/885 |
| 4,200,567 | 4/1980 | Goldman et al. | 260/40 |
| 4,308,335 | 12/1981 | Yamamoto et al. | 430/213 |
| 4,587,290 | 5/1986 | Davies et al. | 524/55 |
| 4,713,414 | 12/1987 | Kusumgar | 525/64 |
| 4,778,851 | 10/1988 | Henton et al. | 525/902 |
| 4,948,822 | 8/1990 | Iovine et al. | 525/902 |
| 4,952,635 | 8/1990 | Heim et al. | 525/243 |
| 5,183,858 | 2/1993 | Sasaki et al. | 525/308 |
| 5,321,056 | 6/1994 | Carson et al. | 523/201 |
| 5,346,953 | 9/1994 | Scobbo, Jr. et al. | 525/74 |

FOREIGN PATENT DOCUMENTS

| | | |
|---|---|---|
| 0115373 | 8/1984 | European Pat. Off. . |
| 0192356 | 8/1986 | European Pat. Off. . |
| 0234063 | 9/1987 | European Pat. Off. . |
| 0305273 | 3/1989 | European Pat. Off. . |
| 0338303 | 10/1989 | European Pat. Off. . |
| 63-63740 | 3/1988 | Japan . |
| 64-69604 | 3/1989 | Japan . |
| 2-251558 | 10/1990 | Japan . |
| 2-283752 | 11/1990 | Japan . |
| 2-294352 | 12/1990 | Japan . |

*Primary Examiner*—W. Robinson Clark
*Attorney, Agent, or Firm*—Nixon & Vanderhye

[57] ABSTRACT

Polyacetal resins can selectively be reduced in terms of surface gloss by the addition of a core-shell polymer. The core-shell polymer which serves as the surface gloss reducing agent is one which has a rubbery polymer as its core, and a glassy vinyl copolymer having an oxygenic group (e.g., a hydroxyl or glycidyl group) as its shell. Preferably, the core-shell polymer is emulsion polymerized in sequential stages to form the core and shell polymers by use of an oligomeric surfactant. The core-shell polymer is most preferably present in the polyacetal compositions in an effective amount of between 1 to 50 parts by weight, based on 100 parts by weight of the polyacetal base resin.

5 Claims, No Drawings

POLYACETAL COMPOSITIONS HAVING SURFACE GLOSS REDUCING EFFECTIVE AMOUNTS OF CORE-SHELL POLYMERS

This is a continuation of application Ser. No. 07/813,271, filed Dec. 24, 1991, now abandoned.

FIELD OF INVENTION

The present invention relates generally to the field of low gloss polyacetal resin composition. More specifically, the present invention relates to novel core-shell polymers which are especially useful as agents to reduce the surface gloss characteristics of molded resin articles (e.g., polyacetal resin), and to equally novel polyacetal molding compositions and molded articles thereof which include an effective amount of such core-shell polymers.

BACKGROUND AND SUMMARY OF THE INVENTION

Polyacetal resin is used in diverse fields as an engineering plastic due to its excellent physical properties, such as mechanical, electrical and chemical properties (e.g., chemical and heat resistances). However, the identification of new end-use applications for polyacetal resins often requires further property alterations and/or enhancements.

One such property that is needed when polyacetal resin is employed to form molded parts used for automotive trim or optical instruments is a relatively low surface gloss. A low surface gloss will thus reduce the light reflectivity property of the molded part. As a result, low surface gloss on molded parts will tend to cause less eye irritation (i.e., since less light will be reflected from the part's surface). Furthermore, low surface gloss on molded parts fabricated from engineering plastics tends to impart a more aesthetically pleasing high-grade appearance to the part.

An ability to "engineer" the surface gloss characteristics would also be beneficial in those instances where molded parts fabricated from polyacetal resin (which inherently exhibits a relatively high surface gloss) are used in cooperation with molded parts formed of other non-polyacetal resins. That is, it would be especially desirable to reduce the surface gloss of polyacetal resin to an extent where it is substantially equivalent to the molded parts of non-polyacetal resin in which it is cooperatively used. An inability to date to reduce the surface gloss of polyacetal resins by controlled amounts so that it is visually imperceptible with parts molded from non-polyacetal resins has thus been one barrier to using polyacetal resin in end-use applications (e.g., as parts for electric and electronic devices) where the polyacetal part will be visible.

Attempts in the past to reduce the inherently high surface gloss of polyacetal resins have included incorporating inorganic filler material, such as calcium carbonate or talc, in a polyacetal base resin. However, large amounts of such inorganic filler material must typically be added to the polyacetal base resin before the desired low surface gloss appearance is realized. The addition of relatively large amounts of inorganic filler material, however, is disadvantageous since it has a tendency to reduce the mechanical characteristics (especially elongation and toughness) normally associated with polyacetal resins. Thus, for example, the mechanical properties may be degraded by the addition of relatively large amounts of filler material to the point where molded parts of such a highly filler-loaded polyacetal resin breaks during assembly or when dropped.

It has also been proposed to lower the surface gloss characteristics of polyacetal articles by incorporating an organic filler material in the form of cross-linked acrylic resin particles. However, this technique is less than satisfactory in terms of the resulting gloss reduction that is achieved. Furthermore, the addition of acrylic resin increases the likelihood that the polyacetal resin may decompose when the acrylic resin particles are blended, kneaded or melt-blended.

Thus, what has been needed is a polyacetal resin composition having reduced surface gloss characteristics which can be "engineered" without affecting the desirable physical properties of polyacetal resin generally. It is towards fulfilling such a need that the present invention is directed.

Broadly the present invention is directed to polyacetal resin compositions which include an effective surface gloss reducing amount of a novel core-shell polymer as a surface gloss reduction (SGR) agent, and to the core-shell polymer itself. In this connection, the core-shell polymer which is employed as the SGR agent is one which has a rubbery polymer core and a glassy (amorphous) polymer shell comprised of a vinyl copolymer having an oxygenic polar group. In preferred embodiments, the low-gloss polyacetal resin compositions of this invention include between 1 to 50 parts by weight of the core-shell polymer per 100 parts by weight of the polyacetal base resin.

Further aspects and advantages of this invention will become more clear from the following detailed description of the preferred exemplary embodiments thereof.

DETAILED DESCRIPTION OF THE PREFERRED EXEMPLARY EMBODIMENTS

A. The Polyacetal Base Resin

The polyacetal base resin that may be used in the compositions of the present invention is a normally solid, high-molecular weight polymer mainly comprised of repeating oxymethylene (—$CH_2O$—) units. The polyacetal base resin may be either a polyoxymethylene homopolymer or a copolymer, terpolymer or block copolymer containing a small amount of other monomeric units in addition to oxymethylene units. The polyacetal resin may be linear, branched or crosslinked. Furthermore, the degree of polymerization of the polyacetal resin is not particularly limited.

B. The Core-Shell Polymer

Core-shell polymers are, in and of themselves known, for example, from U.S. Pat. No. 4,200,567 and Japanese Patent Publication 2-294352 (the entire content of each being expressly incorporated hereinto by reference).

As briefly noted above, however, the core-shell polymer according to the present invention includes a rubbery polymer core and a glassy (amorphous) polymer shell comprised of a vinyl copolymer having an oxygenic polar group. The core-shell polymer can be produced by a serial mult-stage emulsion polymerization process in which a polymer formed in the preceding stage is covered with a polymer formed in the following stage. It is preferred that, in the seed particle-forming stage, the monomer, surfactant and water be fed to the reactor prior to addition to an initiator which initiates the emulsion polymerization reaction.

The first stage polymerization according to the present invention is the stage which forms the rubbery core of the core-shell polymer. In this connection, the monomers that may be employed in the first stage polymerization include conjugated dienes and alkyl acrylates containing 2 to 8 carbon atoms in the alkyl moiety, as well as mixtures thereof. These preferred monomers are thus polymerized in the first stage of the emulsion polymerization process so as to yield the rubbery polymer which will constitute the core of the core-shell polymer.

Specific examples of conjugated dienes that may be employed as the monomer in the first stage polymerization include butadiene, isoprene, chloroprene, and the like, with butadiene being particularly preferred. On the other hand, specific examples of alkyl acrylates that can be employed as monomers in the first stage polymerization include ethyl acrylate, propyl acrylate, butyl acrylate, cyclohexyl acrylate, 2-ethylhexyl acrylate and the like. Butyl acrylate, however, is particularly preferred.

Auxiliary comonomers copolymerizable with the conjugated dienes and/or alkyl acrylates can also be employed in the first stage polymerization. Examples of such auxiliary comonomers include various aromatic vinyl or vinylidene compounds (such as styrene, vinyltoluene, α-methylstyrene, and the like), vinyl or vinylidene cyanide compounds (such as acrylonitrile, methacrylonitrile and the like), and alkyl methacrylates (such as methyl methacrylate, butyl methacrylate and the like).

When the first stage polymerization system does not contain a conjugated diene or, if it does but only in a proportion not exceeding 20 wt. % of the total monomer content in the first stage, then improved impact strength properties can be obtained by incorporating minor (but effective) amounts of a cross-linking monomer and/or a grafting monomer. Examples of suitable cross-linking monomers include, among others, aromatic divinyl monomers such divinylbenzene, and alkane polyol polyacrylates or polymethacrylates such as ethylene glycol diacrylate, ethylene glycol dimethacrylate, butylene glycol diacrylate, hexanediol diacrylate, hexanediol dimethacrylate, oligoethylene glycol diacryalate, oligoethylene glycol (di)acrylate, trimethylolpropatne dimethacrylate, trimethylolpropane triacrylate, trimethylolpropane trimethacrylate, and the like. Particularly preferred are butylene glycol diacrylate and hexanediol diacrylate.

Examples of grafting monomers that may be included in the first stage polymerization system include, among others, allyl esters of unsaturated carboxylic acids, such as allyl acrylate, allyl methacrylate, diallyl maleate, diallyl fumarate, diallyl itaconate and the like. Of these, allyl methacrylate is particularly preferred.

The cross-linking monomer and/or grafting monomer, if used, are present in the first stage polymerization system in an amount up to about 5 weight percent, and preferably between 0.1 to 2 weight percent each, based on the total monomer weight.

The shell phase of the core-shell polymer according to the present invention is especially characterized by a glassy (amorphous) polymer comprised of a vinyl copolymer having an oxygenic polar group. In this connection, core-shell polymers which do not have the requisite oxygenic polar group do not impart a sufficient matting (gloss-reducing) effect upon polyacetal base resin. Likewise, minimal (if any) gloss reduction is achieved when vinyl polymers not having a core-shell structure but having at least one oxygenic polar group are blended with polyacetal base resin.

The term "oxygenic polar group" is intended to encompass hydroxy, ether (—O—), such as glycidyl, amido (—CONH—), imido (—CONHC—) and nitro (—NO$_2$) groups. However, two or more hydroxy (alcohol) groups as the oxygenic polar groups are especially preferred.

A preferred monomer that may be employed in the final-stage polymerization to form the vinyl polymer having at least one oxygenic polar group may be, for example, (meth)acrylates having hydroxyl and/or glycidyl functional groups. In this connection, specific examples of (meth)acrylates having hydroxyl functional groups include hydroxyethyl (meth)acrylate and hydroxypropyl (meth)acrylate, among which hydroxyethyl methacrylate is preferred. Specific examples of (meth)acrylates having a glycidyl functional group include glycidyl acrylate and glycidyl methacrylate, of which the latter is preferred.

Furthermore, vinyl monomers having an oxygenic polar group other than the (meth)acrylates described above may be employed. For example, allyloxyethanol or allyl glycidyl ether may also be used as a comonomer to form the vinyl polymer forming the shell of the core-shell polymer according to this invention.

The monomers constituting the glassy polymer together with the above-noted monomer having an oxygenic polar group include alkyl (meth)acrylates such as methyl(meth)acrylate, ethyl (meth)acrylate, butyl (meth)acrylate, and the like, aromatic vinyl or vinylidene compounds such as styrene, vinyltoluene α-methylstyrene and the like, and vinyl or vinylidene cyanides such as acrylonitrile methacrylo-nitrile and the like. Particularly preferred are methyl methacrylate, styrene and acrylonitrile.

An intermediate phase may be interposed between the first-stage polymer phase and the final-stage polymer phase, if desired. The intermediate phase, if present, can be provided by subjecting a polymerizable monomer having functional groups, such as glycidyl methacrylate, methacrylic acid, hydroxyethyl methacrylate, and the like, a polymerizable monomer forming a glassy polymer such methyl methacrylate, or a polymerizable monomer forming a rubbery polymer, such as butyl acrylate, to polymerization conditions in an intermediate emulsion polymerization stage.

A variety of intermediate phase morphologies can be selected according to the properties that are desired for the resulting core-shell polymer. In this regard, core-shell polymer having such an intermediate phase may, for example, be a multilayer system in which the intermediate phase in interposed as a layer between the core and shell polymers, or as a "salami-like" system in which the intermediate phase is dispersed as small particles throughout the core polymer. In this latter morphology, the intermediate phase may form a new subcore in the center of the core polymer as is sometimes the case when styrene or the like is used as the intermediate phase-forming monomer.

The use of a core-shell polymer having an intermediate phase may result in improvements in the impact strength and heat-distortion temperature, as well as enhancements in the flexural modulus. In addition, improved appearance characteristics of the core-shell polymer as a result of the presence of the intermediate phase may result due to decreased molding delamination and reduced pearlescence and color variations because of refractive index changes in the resulting molded articles.

The emulsion polymerization according to the present invention is preferably carried out using a surfactant, such as a nonionic surfactant or an oligomeric anionic or nonionic surfactant, as well as a polymerization initiator, such as an azo or peroxide polymerization initiator.

A number of well known surfactants that are commonly used in emulsion polymerization processes generally can also be employed in the emulsion polymerization process according to this invention. Thus, for example, nonionic ether type surfactants such as polyoxyethylene nonylphenyl ether, polyoxyethylene stearyl ether, polyoxyethylene lauryl ether, and the like; nonionic ester type surfactants such as polyoxyethylene monostearate and the like; nonionic sorbitan ester type surfactants, such as polyoxyethylene sorbitan monolaurate and the like; and nonionic block copolymer type surfactants such as polyoxyethylene polyoxypropylene block copolymers and the like may satisfactorily be employed.

The preferred surfactants to be used in the processes of this invention, however, are oligomeric anionic or nonionic surfactants such as those which have been used in emulsion polymerization reactions for certain specialized purposes. For example, oligomeric surfactants of the following formula (and which are described in Japanese Patent Publication Nos. 34832/1972, 34833/1972 and 38080/1972, the entirety of each being expressly incorporated hereinto by reference) can be employed in the emulsion polymerization process of this invention:

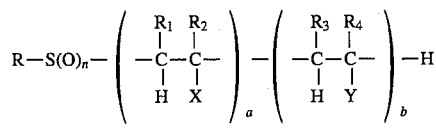

wherein the structural units represented by the formulas:

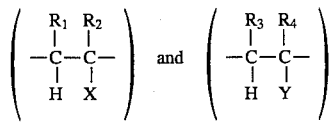

are randomly arranged in the surfactant's molecule, and wherein R represents an alkyl group of 5 to 20 carbon atoms, preferably 6 to 12 carbon atoms; n is 0, 1 or 2, and preferably 0 or 1, and more preferably O; $R_1$ and $R_3$, which may be the same or different, represent —H, —CH$_3$, —C$_2$H$_5$, or —COOH; $R_2$ and $R_4$, which may be the same or different, represent —H, —CH$_3$, —C$_2$H$_5$, —COOH or —CH$_2$COOH; X represents —COOH, CONH$_2$, —OCH$_3$ or —OC$_2$H$_5$; and Y represents —CH$_2$OH,

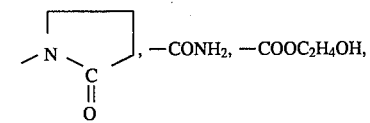

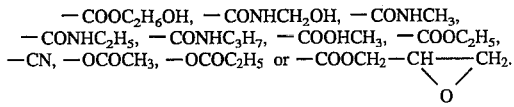

In other words, the surfactant may be defined by the formula:

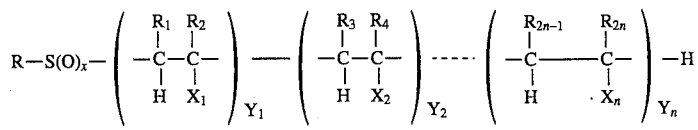

where R is an alkyl group of 5 to 20 carbon atoms, preferably 6 to 12 carbon atoms, Z is equal to 0, 1 or 2 (preferably 0 or 1, and more preferably 0)) n is an integer of 2 or greater; $R_{2n-1}$ is —H, —CH$_3$, —C$_2$H$_5$ or —COOH; $R_{2n}$ is —H, —CH$_3$, —C$_2$H$_5$, —COOH or —CH$_2$COOH; $X_n$ is —COOH, —CONH$_2$, —OCH$_3$, —OC$_2$H$_5$, —CH$_2$OH,

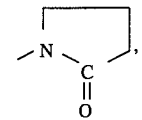

—CONH$_2$, —COOC$_2$H$_4$OH, —COOC$_2$H$_6$OH, —CONHCH$_2$OH, —CONHCH$_3$, —CONHC$_2$H$_5$, —CONHC$_3$H$_7$, —COOHCH$_3$, —COOC$_2$H$_5$, —CN, —OCOCH$_3$, —OCOC$_2$H$_5$ or

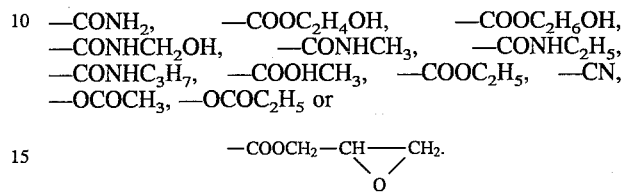

The weight average molecular weight of the oligomeric surfactant to be used in accordance with the present invention is between about 200 to 5000, and preferably between about 1500 to 3000, with the degree of polymerization (a+b or

$$\sum_{a-1}^{n} Ya)$$

ranging from about 6 to about 50.

The oligomeric surfactant as such may be water-soluble. However, if the surfactant is not water-soluble, then it is converted to a water-soluble salt by reacting the non-water-soluble precursor with an oxide, hydroxide or alcohol. The water-soluble salt may include, among others, alkali metal salts, alkaline earth metal salts, Group III heavy meatal salts, ammonium salt, substituted ammonium salts, and the like. Particularly preferred is ammonium salt.

The proportion of the oligomeric surfactant that is employed in the practice of this invention is selected with reference to the particle stabilizing power of the particular surfactant that is used.

The oligomeric surfactants can be synthesized, for example, according to the techniques described in Japanese patent Publication No. 47-34832 (the entire content of which is expressly incorporated hereinto by reference), by the addition-polymerization of relevant monomers in an anhydrous solvent in the presence of an alkyl mercaptan and, if necessary, oxidizing the oligomer with hydrogen peroxide or ozone to the corresponding sulfoxide or sulfone. The alkyl mercaptan may include, among others, n-octyl mercaptan, n-dodecyl mercaptan, t-dodecylmercaptan, n-decyl mercaptan and the like. The addition polymerization is typically carried out in the temperature range of between about 20 to about 100° C.

The monomers mentioned above include α,β-ethylenically unsaturated monomers having at least one polar group, such as (meth)acrylic acid, α-ethyl acrylate, β-methyl acrylate, α,β-dimethyle acrylate, caproic acid, itaconic acid, fumaric acid, maleic acid, (meth)acrylamide, vinyl ethyl ether, vinyl methyl ether, allyl alcohol, vinylpyrrolidone, (meth)acrylonitrile, ethylacrylonitrile, methyl (meth)acrylate, ethyl acrylate, hydroxyethyl (meth)acrylate, hydroxypropyl (meth)acrylate, vinyl acetate, vinyl propionate, N-isopropylacrylamide, N-ethylacrylamide, N-methylacrylamide, glycidyl (meth)acrylate, N-methylolacrylamide and the like.

The solvent that is used during the addition polymerization is preferably a lower alkanol, such as methanol, ethanol, isopropyl alcohol and the like.

As noted briefly above, azo type initiators, such as azobis(isobutyronitrile), dimethyl 2,2'-azobis(isobutyrate ), 2,2'-azobis (2-amidinopropane) dihydrochloride, and peroxides, such as cumene hydroperioxide, diisopropylbenzene hydroperoxide, hydrogen peroxide can be employed successfully. These specific initiators may be used alone or in combination.

The emulsion polymerization in a reaction system containing the nonionic surfactant and/or oligomeric surfactant, and an azo and/or a peroxide initiator yields a core-shell polymer which includes minimal (if any) sulfur-containing anions (e.g., sulfur oxide compounds such as sulfate, persulfate, sulfite and sulfonate). If present, the content of sulfur-containing anions (such as sulfate or sulfate ester ions) in the core-shell polymer according to the present invention is so low as not to be detected by the following conventional qualitative tests for sulfur-containing anions. Since the core-shell polymer according to the present invention is substantially free from sulfur-containing anions, it can homogeneously be melt-blended with polyacetal resin without detrimentally affecting the polyacetal resin's properties so as to produce polyacetal-based resin compositions which exhibit excellent surface-dullness, impact resistance, and elongation.

The presence of sulfur-containing anions in a core-shell polymer can be determined by a qualitative test procedure which includes weighing 5 g of a core-shell polymer sample and placing it in a 50 ml. Erlenmeyer flask to which 20 ml. of deionized water is added. The contents of the flask are stirred with a magnetic stirrer for 3 hours, after which the contents are filtered through a No. 5 filter paper. The filtrate is divided into two portions. 0.5 ml of a 1% aqueous solution of barium chloride is added to one of the portions and the turbidity of the resulting mixture is compared with that of the other filtrate portion.

The core-shell polymer according to the present invention can be in the form of granules, flakes or powders, for example, by producing a latex of the core-shell polymer using the above-described emulsion polymerization process in the presence of a surfactant and initiator. The latex is then subjected to a freeze-thaw cycle so as to separate the polymer, followed by centrifugally dehydrating the polymer and final drying. The solvent and the surfactant used in the emulsion polymerization process can thus substantially be removed from the core-shell polymer.

Alternatively, the latex may be dried and used in its as produced form, instead of being subjected to a freeze-thaw cycle described above. In this connection, spray-drying using a spray drier can also be utilized for recovery of the core-shell polymer from the latex.

The core-shell polymer thus isolated and recovered may then be processed into pellets by means of an extruder or pelletizer. Alternatively, the recovered core-shell polymer may be directly melt-blended with a matrix resin to achieve improved impact strength properties, for example, for the resulting melt-blended composition.

The core-shell polymer described above is present in the composition of the present invention in an amount between 1 to 50 parts by weight, and preferably 1 to 20 parts by weight, per 100 parts by weight of the polyacetal base resin. If the amount of the core-shell polymer is too small, insufficient reduction of the surface gloss will ensue. On the other hand, if the amount of the core-shell polymer is excessive, the mechanical properties, particularly stiffness, will be adversely affected. In addition, excessive amounts of the core-shell polymer will impart detrimental effects upon the compositions' heat stability characteristics.

Molded articles formed from the polyacetal compositions of this invention not only exhibit uniformly lower surface gloss and high-grade appearance characteristics, but also retain the excellent mechanical properties that are inherent in polyacetal resin. The reasons why these effects are obtained are not fully understood at this time. However, without wishing to be bound to any particular theory, it is surmised that the core-shell polymer is dispersed in the surface region of the molded article in the form of particles having a size between 0.5 to 2.0 μm. As a result, the surface of the article is roughened by the presence of these core-shell polymer particles. In addition, the oxygenic polar groups are uniformly dispersed on the surface of the article so that its surface appearance is modified resulting in lower surface gloss.

The compositions of this invention typically exhibit a surface gloss of 35% or less, and more typically, 25% or less as determined at a reflection angle of 45°–45° according to JIS K 7105.

It is desirable that the compositions of this invention may include known heat stabilizers so as to improve the heat stability of the resulting composition. In this connection, it is desirable to use one or more stabilizers selected from among known antioxidants, nitrogen compounds, and alkali or alkaline earth metal compounds.

In addition, the compositions of the present invention may suitably be colored by the incorporation of various carbon blacks or other dyes and/or pigments conventionally employed in the field of engineering resins. Furthermore, virtually any other additive employed in engineering resins conventionally may be incorporated into the compositions of the present invention so as to achieve desired property characteristics.

The compositions of the present invention can be prepared by conventional processes for preparing synthetic resin compositions using conventional processing equipment. For example, the necessary components may be mixed together, kneaded and extruded with a single- or twin-screw extruder to provide pellets, followed by molding of the pellets to form articles. Alternatively, the composition may be prepared by adding all components to a molding machine so that melt-blending occurs simultaneously with molding to form articles. Further, a part or the entirety of the resin components may be pulverized and mixed with the residual components, followed by melt-extrusion to provide pellets. The pellets may then be employed to form molded articles. The above-noted optional stabilizers and additives may arbitrarily be added in any process step prior to the production of a final molded article.

The compositions of this invention can be molded using virtually any molding technique conventionally employed for thermoplastic resins generally, such as injection, extrusion and compression (pressing) molding techniques. Preferably, the compositions of this invention are molded at temperatures of between 180° to 240° C.

The polyacetal compositions of the present invention exhibit significantly improved effects in terms of lowering the surface gloss characteristics for molded articles formed of the compositions by virtue of the presence of the core-shell polymer, without detrimentally affecting the inherent physical and mechanical properties that are attributable to the polyacetal base resin. Accordingly, molded articles having satisfactory physical and mechanical properties can be provided with "engineered" surface gloss characteristics. Furthermore, the compositions of this invention exhibit improved mechanical and thermal stability properties. As a result, molded articles formed of the compositions of this invention may suitably be employed in a number of end-use applications, for example, as automotive interior trim parts, components for optical instruments and electric or electronic apparatus, and the like.

Further aspects and advantages of this invention will become more clear after careful consideration is given to the following detailed description thereof which follows.

EXAMPLES

In the following Examples, all components are expressed in parts by weight, and the following abbreviations have been used:

| Component | Abbreviation |
| --- | --- |
| ethyl acrylate | EA |
| methyl methacrylate | MMA |
| butyl acrylate | BA |
| 1,4-butylene glycol diacrylate | BGA |
| allyl methacrylate | AlMA |
| methacrylamide | MAM |
| nonionic surfactant (polyoxyethylene nonylphenyl ether, Emulgen 950, Kao Corporation) | E950 |
| deionized water | DIW |
| 2,2'-azobis(2-aminopropane) dihydrochloride (V50, Wako Pure Chemical Industries, Ltd.) | V50 |
| 2-hydroxyethyl methacrylate | HEMA |
| styrene | St |
| glycidyl methacrylate | GMA |
| polyacetal resin | POM |
| oligomeric anionic surfactant | Surfactant A |

The oligomeric anionic surfactant designated "Surfactant A" had the following formula and was synthesized as in Example 13 of Japanese Kokai Patent Application No. 53-10682 (the entire content of which is incorporated fully hereinto by reference), adjusted to pH 7.5 with aqueous ammonia and diluted with purified water to make a solid content of 10%:

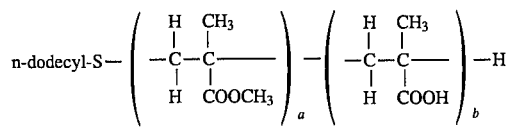

(wherein a:b=7:3, a+b=13.6, and weight average molecular weight=1310)

| Composition | Amount |
| --- | --- |
| methacrylic acid | 155 g |
| MMA | 360 g |
| n-DMP | 109 g |
| AIBN | 4.4 g |

| Composition | Amount |
| --- | --- |
| isopropyl alcohol | 314 g |

Example 1

Production of Core-Shell Polymer A 1200 g of DIW, 1.68 g of 25% aqueous ammonia, 7 g of surfactant A and 0.14 g of MAM were charged into a 5 liter polymerization reactor equipped with a reflux condenser. The reactor charge was heated to 70° C. under a stream of nitrogen while being stirred. 27.86 g. of a seed monomer mixture of the following composition was then added and dispersed over 10 minutes, followed by the addition of 21 g of a 10% aqueous solution of V50 to initiate seeded polymerization:

| Seed Monomers | Amount |
| --- | --- |
| EA | 27.664 g |
| AlMA | 0.14 g |
| BGA | 0.056 g |

After 7 g of MAM were added, monomer emulsion prepared by adding 210 g of surfactant A, 900 g of DIW and 2.80 g of 25% aqueous ammonia to 1365 g or a core monomer mixture of the following composition and a mixture of 21.0 g of a 10% aqueous solution of V50 and 0.63 g of 1% aqueous ammonia were continuously fed over a period of 180 minutes for further seeded polymerization:

| Core Monomer Mixture: | |
| --- | --- |
| Component | Amount |
| BA | 1215.2 g |
| MMA | 140.0 g |
| BGA | 2.8 g |
| AlMA | 7.0 g |

The reaction mixture was heated to 80° C., aged for one hour and cooled to 70° C., after which, 9 g or a 10% aqueous solution of V50 and 0.27 g or 1% aqueous ammonia were added to the reactor. A shell monomer emulsion of the following composition, 12 g of a 10% aqueous solution of V50 and 0.36 g of 1% aqueous ammonia were continuously fed thereinto over 60 minutes for further seeded polymerization:

| Shell Monomer Emulsion: | |
| --- | --- |
| Component | Amount |
| MMA | 265.8 g |
| EA | 60.0 g |
| Surfactant A | 30.0 g |
| DIW | 500.0 g |
| 25% aqueous ammonia | 0.72 g |
| St | 180.0 g |
| HEMA | 90.0 g |
| BGA | 1.2 g |
| MAM | 3.0 g |

The reaction mixture was heated to 80° C., aged for one hour, cooled, and filtered through a 300-mesh stainless steel screen to yield a core-shell polymer latex.

The latex was frozen at −15° C., thawed to room temperature and filtered through a glass filter. The filter cake was dried in an air current at 60° C. for 24 hours to give the core-shell polymer A.

Examples 2 to 4

Production of Core-Shell Polymers B to D, Respectively

Polymerization was carried out in the same manner as that of Example 1 above, except that each monomer mixture was the composition specified in the following Table 1. Also in these examples, 35 g of the core monomer mixture was used as the seed monomers. The results of these examples were that core-shell polymers B to D were obtained.

TABLE 1

| Monomer composition | Core-shell polymer (symbol) | | |
|---|---|---|---|
| (pts. by wt.) | B | C | D |
| Core | | | |
| BA | 1243.2 | 1243.2 | 1250.2 |
| MMA | 140.0 | 140.0 | 140.0 |
| BGA | 2.8 | 2.8 | 2.8 |
| AlMA | 14.0 | 14.0 | 7.0 |
| Shell | | | |
| MMA | 448.8 | 508.8 | 478.8 |
| EA | 60.0 | 60.0 | 60.0 |
| GMA | — | — | 60.0 |
| HEMA | 90.0 | 30.0 | — |
| BGA | 1.2 | 1.2 | 1.2 |

Examples 5 to 13

Production of POM Resin Compositions (1) to (9)

A POM copolymer resin (a product of Polyplastics Co., Ltd., trade-name Duracon) and each of the core-shell polymers A to D produced above were dried until the water content had been reduced to 0.3%. These components were then melt-blended with one another at a ratio specified in Table 2 below using a twin-screw extruder PCM-30 manufactured by Ikegai Corporation at a cylinder temperature of 200° C. and a die head temperature of 200° C. to form pelletized POM compositions (1) to (9).

Comparative Example 1

Production of POM Resin Composition (10)

A POM copolymer resin and an impact modifier E (a product of Rohm & Haas: KM330) were melt-kneaded together at a ratio specified in Table 3 to obtain pelletized POM resin composition (10).

Comparative Example 1

Production of Core-Shell Polymer F 1320 g of DIW and 66 g of a 10% aqueous solution of E950 were charged into a 5 liter polymerization reactor equipped with a reflux condenser, with the charge being stirred and heated to 70° C. under a nitrogen stream. 77 g of a core monomer mixture of the following composition were added and dispersed over 10 minutes, followed by addition of 154 g of a 2% aqueous solution of V50 to initiate a seeded polymerization.

| Core Monomer Mixture: | |
|---|---|
| Component | Amount |
| EA | 1533.84 g |
| AlMa | 3.08 g |
| BGA | 3.08 g |

A monomer emulsion was then prepared by adding 440 g of a 10% aqueous solution of E950 and 440 g of DIW to the remainder (1463 g) of the core monomer mixture was continuously fed over 180 minutes for further seeded polymerization.

The reaction mixture was aged at a temperature of 70° C. for one hour and transferred to the second polymerization stage.

In the second polymerization stage 66 g of a 2% aqueous solution of V50 was added to the reactor and 1120 g of a shell monomer emulsion of the following composition was continuously fed over 60 minutes for further seeded polymerization:

| Shell Monomer Emulsion: | |
|---|---|
| Component | Amount |
| MMA | 594.0 g |
| EA | 66.0 g |
| 10% aqueous solution E950 | 220.0 g |
| DIW | 440.0 g |

The reaction mixture was heated to 80° C., aged for one hour, cooled and filtered through a 300-mesh stainless steel screen to give a core-shell polymer latex.

This polymer latex was frozen at −15° C., thawed to room temperature and filtered through a glass filter. The filter cake was dried in an air current at 60° C. to yield the core-shell polymer F.

Comparative Examples 3 and 4

Production of POM Resin Compositions (110 and (12)

Pelletized POM resin compositions (11) and (12) were produced by using the core-shell polymer F in a similar manner to that described above for the preparation of POM composition (1). The formulation of each composition is given in Table 3.

Comparative Examples 5 and 6

Production of Acrylic Resins G and H

A monomer mixture of the following composition was solution-polymerized randomly in toluene at 70° C. using AlBN as a polymerization initiator (in an amount of 0.1% by weight based on the monomer mixture). The formed polymer was precipitated in a poor solvent and dried to obtain acrylic resins G and H having the following comonomer contents:

Acrylic Resin G: MMA/HEMA=80/20
Acrylic Resin H: MMA/GMA=80/20

Comparative Examples 7 to 10

Production of POM Resin Compositions (13) to (16)

Pelletized POM resin compositions (13) to (16) were produced by using the core-shell polymer F and acrylic resins G and H prepared in Comparative Examples 2,5 and 6 in a similar manner to that used to prepared POM composition (1). The formulations of each composition is given in Table 3.

Qualitative Test for Sulfate Ions

The sulfate ions in the core-shell polymers A to D, F and the impact modifier E were determined by the following procedure. 5 g of each sample were weighed into a 50 ml conical flask to which 20 ml of DIW was added. The mixture was then stirred with a magnetic stirrer for 3 hours. The stirred mixture was filtered through a no. 5 C filter paper with the filtrate thereafter being divided into two substantially equal portions. 0.5 ml of a 1% aqueous solution of barium chloride was added to one of the portions and the relative turbidity of the two portions was then qualitatively observed.

According to this test, no sulfate ions were detected in the core-shell polymers A to D and F, but sulfate ions were detected in the impact modifier E.

Evaluation of Physical Characteristics

The POM resin compositions (1) to (17) produced in the manner described above and a control resin composition which did not contain any impact modifier were each examined for various physical characteristics according to the following procedures. The results appear in Tables 2 and 3.

(1) Determination of Surface Appearance and Surface Gloss Characteristics

A test piece (70 mm×40 mm×30 mm) prepared by molding each composition under the following conditions was examined for surface appearance and surface gloss characteristics:

| Molding Machine: | Toshiba Corporation, IS 80 | | | |
|---|---|---|---|---|
| Molding Conditions: | nozzle | C1 | C2 | C3 |
| cylinder temp. (°C.) | 200 | 190 | 180 | 160 |
| injection pressure | 650 kg/cm$^2$ | | | |
| injection speed | 1.0 m/min | | | |
| mold temp. (°C.) | 80 | | | |

(i) Surface Appearance: The surface appearance was evaluated in terms of dullness and surface uniformity and classified subjectively into the following four ranks, whereby the lesser ranking means better dullness and higher uniformity.

| Rank | |
|---|---|
| 1 | Surface is uniformly rough and no outline of a fluorescent illuminating lamp is visible on the surface |
| 2 | the surface is nonuniformly rough, but no outline of the illuminating lamp is observed |
| 3 | an obscure outline of the lamp is perceptible |
| 4 | a clear outline of the lamp is perceptible, and the surface is nearly smooth |

(ii) Surface Gloss: The surface gloss was determined at a reflection of 45°–45° according to JIS K 7105 using a digital glossmeter of the variable angle type manufactured by Suga Test Instruments Co., Ltd., UGV-40.

(2) Tensile Test

The tensile strength and elongation of the specimens were determined according to ASTM D638.

(3) Izod Impact Strength (Notched)

Notched Izod impact strength data was obtained using the procedures of ASTM D256.

TABLE 2

| | POM resin composition No. | | | | | | | | |
|---|---|---|---|---|---|---|---|---|---|
| (Example) | 1 | 2 | 3 | 4 | 5 | 6 | 7 | 8 | 9 |
| POM resin (pts. by wt.) | 100 | 100 | 100 | 100 | 100 | 100 | 100 | 100 | 100 |
| Core-shell polymer | | | | | | | | | |
| symbol | A | B | B | B | B | C | C | C | D |
| (pts. by wt.) | 10 | 5 | 10 | 20 | 30 | 5 | 10 | 20 | 10 |
| Acrylic resin | | | | | | | | | |
| symbol | | | | | | | | | |
| (pts. by wt.) | | | | | | | | | |
| Surface appearance | 1 | 2 | 1 | 1 | 1 | 2 | 1 | 1 | 1 |
| Gloss (45°–45°) (%) (mirror surface) | 15 | 23 | 14 | 10 | 8.5 | 27 | 22 | 14 | 21 |
| Tensile test | | | | | | | | | |
| elongation (%) | 79 | 78 | 96 | 104 | 121 | 87 | 105 | 126 | 84 |

TABLE 2-continued

| (Example) | POM resin composition No. | | | | | | | | |
|---|---|---|---|---|---|---|---|---|---|
| | 1 | 2 | 3 | 4 | 5 | 6 | 7 | 8 | 9 |
| strength (kg/cm²) | 522 | 530 | 490 | 475 | 459 | 531 | 490 | 455 | 520 |
| Izod impact strength (kg · cm/cm) | 7.8 | 10.0 | 9.0 | 11.2 | 14.9 | 9.1 | 10.0 | 12.5 | 8.5 |

TABLE 3

| (Comparative Example) | POM resin composition No. | | | | | | | | |
|---|---|---|---|---|---|---|---|---|---|
| | 10 | 11 | 12 | 13 | 14 | 15 | 16 | 17 | control |
| POM resin (pts. by wt.) | 100 | 100 | 100 | 100 | 100 | 100 | 100 | 100 | 100 |
| Core-shell polymer | | | | | | | | | |
| symbol | E | F | F | | | | F | | |
| (pts. by wt.) | 10 | 10 | 20 | | | | 10 | | |
| Calcium carbonate (pts. by wt.) | | | | | | | | 20 | |
| Acrylic resin | | | | | | | | | |
| symbol | | | | G | G | H | G | | |
| (pts. by wt.) | | | | 10 | 20 | 10 | 10 | | |
| Surface appearance | (*1) | 4 | 3 | 4 | 3 | 4 | 4 | 2 | 4 |
| Gloss (45°–45°) (%) (mirror surface) | — | 65 | 48 | 52 | 37 | 55 | 57 | 27 | 79 |
| Tensile test | | | | | | | | | |
| elongation | — | 101 | 129 | 35 | 22 | 24 | 57 | 21 | 58 |
| strength (kg/cm²) | — | 494 | 470 | 574 | 585 | 573 | 528 | 516 | 580 |
| Izod impact strength (kg · cm/cm) | — | 11.0 | 13.8 | 3.3 | 2.9 | 3.1 | 6.2 | 3.4 | 5.5 |

Note to Table 3:
(*1)POM resin composition (10) failed during molding, presumably owing to bubbling during the extrusion caused by the decomposition of polyoxymethylene, and as a result, the surface appearance was not evaluated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable polyacetal resin composition exhibiting low surface gloss characteristics comprising a melt blend of a polyacetal base resin and a surface gloss reducing agent, wherein said surface gloss reducing agent is a core-shell polymer comprised of:

a core consisting essentially of a rubbery polymer, and an outer shell consisting essentially of a glassy vinyl copolymer having at least one oxygenic polar group such that the oxygenic polar groups are dispersed uniformly on the outer shell surface, and wherein said oxygenic polar group of said glassy vinyl copolymer is at least one selected from the group consisting of hydroxyl or glycidyl groups, said core-shell polymer being the azo-initiated emulsion polymerization reaction product in the presence of a nonionic surfactant or an oligomeric surfactant having a weight-average molecular weight of between about 200 to 5000 which is defined by the following formula:

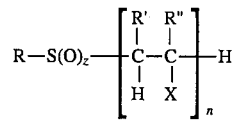

wherein,
R is an alkyl group of 5 to 20 carbon atoms;
z is 0, 1 or 2;
n is a positive integer;
R', which may be the same or different, is —H, —CH₃, —C₂H₅, or —COOH;
R", which may be the same or different, is —H, —CH₃, —C₂H₅, —COOH or —CH₂COOH;
X, which may be the same or different is —COOH, —CONH₂, —OCH₃, —OC₂H₅, —CH₂OH, —COOC₂H₄OH, —COOC₂H₆OH,

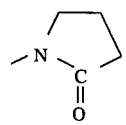

—CONHCH₂OH, —CONHCH₃, —CONHC₂H₅, —CONHC₃H₇, —COOHCH₃, —COOC₂H₅, —CN, —OCOCH₃, —OCOC₂H₅, or

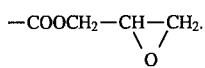

2. The composition as in claim 1, wherein said glassy vinyl copolymer shell is hydroxyethyl methacrylate or glycidyl methacrylate.

3. The composition as in claim 1, wherein the core-shell polymer is present in an amount between 1 to 50 parts by weight per 100 parts by weight of the polyacetal base resin.

4. The composition as in claim 1, wherein the core-shell polymer is present in an amount between 1 to 20 parts by weight per 100 parts by weight of the polyacetal base resin.

5. The composition as in claim 1, wherein said polyacetal base resin is selected from polyoxymethylene homopolymers and copolymers comprised mainly of repeating oxymethylene units.

* * * * *